US006944126B1

(12) United States Patent  
Varma et al.

(10) Patent No.: US 6,944,126 B1  
(45) Date of Patent: Sep. 13, 2005

(54) METHOD FOR DETERMINING LOSS RATE OR A LOSS CURVE OF A VIDEO SOURCE OR MULTIMEDIA TRAFFIC

(75) Inventors: Anujan Varma, Santa Cruz, CA (US); Christos Tryfonas, Foster City, CA (US)

(73) Assignee: The Regents of the University of California, Oakland, CA (US)

( * ) Notice: Subject to any disclaimer, the term of this patent is extended or adjusted under 35 U.S.C. 154(b) by 755 days.

(21) Appl. No.: 09/741,747

(22) Filed: Dec. 19, 2000

Related U.S. Application Data

(60) Provisional application No. 60/171,669, filed on Dec. 20, 1999.

(51) Int. Cl.[7] ................................................. H04L 1/00
(52) U.S. Cl. ...................................... 370/233; 370/253
(58) Field of Search ............................. 370/230.1, 232, 370/233, 234, 235.1, 252, 253

(56) References Cited

U.S. PATENT DOCUMENTS

| | | | | |
|---|---|---|---|---|
| 5,274,625 | A * | 12/1993 | Derby et al. | 370/233 |
| 5,404,354 | A * | 4/1995 | Hayter et al. | 370/230 |
| 5,583,792 | A * | 12/1996 | Li et al. | 709/224 |
| 6,108,382 | A * | 8/2000 | Gringeri et al. | 375/240.01 |
| 6,310,857 | B1 * | 10/2001 | Duffield et al. | 370/232 |
| 6,600,752 | B1 * | 7/2003 | Duong-Van | 370/412 |
| 2002/0073224 | A1 * | 6/2002 | Varma et al. | 709/233 |

FOREIGN PATENT DOCUMENTS

| | | | | |
|---|---|---|---|---|
| EP | 658999 A2 * | 6/1995 | | H04L 12/56 |
| WO | WO 2052800 A1 * | 7/2002 | | H04L 12/56 |

OTHER PUBLICATIONS

Gringeri, S. et al. "Traffic Shaping, Bandwidth Allocation, and Quality Assessment for MPEG Video Distribution Over Broadban Networks". Network, IEEE. Nov./Dec. 1998. vol. 12, iss. 6, pp. 94-107.*

Alam, M.F. et al. "Efficient MPEG Video Traffic Shaping for the Next Generation Internet". Global Telecommunications Conference, 1999. GLOBECOM '99. vol. 1a, pp. 364-368.*

International Organization for Standardization, "Information Technology-Generic Coding of Moving Pictures and Associated Audio: Systems, Recommendation H.222.0, ISO.IEC 13818-1," draft of International Standard Edition, Cover page + pp. ii-xix, pp. 1-136, Nov., 1994.

Tryfonas, C., "MPEG-2 Transport Over ATM Networks," Master's Thesis, University of California at Santa Cruz, Cover page + pp. iii-xiii, pp. 1-116, Sep., 1996.

(Continued)

Primary Examiner—Hassan Kizou
Assistant Examiner—Donald L Mills
(74) Attorney, Agent, or Firm—John P. O'Banion

(57) ABSTRACT

A method is disclosed for efficiently determining exact loss rate, or a loss curve, for a traffic source transmitted at a specified rate. The loss curve of a traffic source characterizes the loss rate of the traffic stream as a function of the allocated buffer size for a given transmission rate. Utilization of loss curve characterization allows for optimal resource allocation for a given source within a packet network. The present invention provides a deterministic method for computing the loss curve of a traffic source, examples of which include multimedia streams, elementary video streams, and MPEG-2 transport streams. The present method exploits the piecewise linearity of the loss curve and computes only the points at which the slope of the loss curve changes. The method is memory efficient and executes rapidly, for instance, a loss curve for a two-hour elementary video stream was determined within eleven seconds on a conventional Sun Ultra-2™ workstation.

7 Claims, 8 Drawing Sheets

OTHER PUBLICATIONS

Cruz, R., "A Calculus for Network Delay, Part I: Network Elements in Isolation," IEEE Transactions on Information Theory, 37(1): pp. 114-131, Jan., 1991.

Cruz, R., "A Calculus for Network Delay, Part II: Network Analysis," IEEE Transactions on Information Theory, 37(1): pp. 132-141, Jan., 1991.

Low, S., Varaiya, P., "A Simple Theory of Traffic and Resource Allocation in ATM," In Proceedings of GLOBECOM '91, vol. 3, pp. 1633-1637, Dec., 1991.

Garrett, M.W., "Contributions Toward Real-Time Services on Packet-Switched Networks," Ph.D. Thesis for Mark William Garrett, pp. 1-168, May, 1993.

Wong, Michael K., Varaiya, Pravin P., "A Deterministic Fluid Model for Cell Loss in ATM Networks," INFOCOM '93, Proceedings of the Twelfth Annual Joint Conference of the IEEE Computer and Communications Societies, pp. 395-400 vol. 2, Mar. 28-Apr. 1, 1993.

Botvich, D.D., Duffield, N.G., "Large Deviations, The Shape of the Loss Curve, and Economies of Scale in Large Multiplexers," Queueing Systems, vol. 20, pp. 293-320, (1995).

Tryfonas, Christos, Varma, Anujan, Varma, Subir, "Efficient Algorithms for Computation of the Burstiness Curve of Video Sources," Proceedings of Packet Video Workshop, New York City, Cover Page + pp. 1-17 + Appendix A-1 thru C-2, Apr. 26-27, 1999. Also published as below identified.

Tryfonas, Christos, Varma, Anujan, Varma, Subir, "Efficient Algorithms for Computation of the Burstiness Curve of Video Sources," University of California at Santa Cruz Technical Report, UCSC-CRL-99-2, Cover Page + pp. 1-17 + Appendix A-1 thru C-2, Jan. 25, 1999.

MPEG Traces, ftp://ftp-info3.informatik.uni-wuerzburg.de/pub/MPEG, Index pp. 1, Mar., 1995.

* cited by examiner

```
/* ========================================= */
/* ========== Compute Active Periods ========== */
/* ========= for an Elementary Video Stream ========= */
/* ========================================= */
```

/* Index $i$ denotes the $i$-th frame, $q_i$ denotes the queue size at the instant just after the $i$-th frame arrival and index $j$ denotes the $j$-th active period. */

1 /* Perform initialization */

1.1 $s_1^r \leftarrow 1/f;\ q_1 \leftarrow d_1;\ i \leftarrow j \leftarrow 1;$

2

2.1 If ( $[(q_i)/(r)] <\in ^1/_f$ ) /* no backlog present at the start of next frame */

2.1.1 $q_{i+1} \leftarrow d_{i+1};$ 2.1.2 $t_j^r \leftarrow {}^i/_f + [(q_i)/(r)];$ /* compute end time of current active period */

2.1.3 $j \leftarrow j+1;$ 2.1.4 $s_j^r \leftarrow [(i+1)/(f)];$ /* start time of new active period */

2.2 else 2.2.1 $q_{i+1} \leftarrow q_i + d_{i+1} - {}^r/_f;$ /* there is backlog carried to current frame */

2.3 endif

3

3.1 $i \leftarrow i+1;$ 3.2 If $(i <\in N)$ 3.2.1 goto Step 2;

3.3 endif

4

4.1 $s(r) \leftarrow \max_{1 \le k \le N} q_k;$ /* compute maximum queue length observed */

4.2 $t_j^r \leftarrow {}^N/_f + [(q_N)/(r)];$ /* compute end time of last active period */

4.3 $n_a(r) \leftarrow j;$ /* store the number of active periods */

4.4 Define $s_{n_a(r)+1} = \infty;$

FIG. 2

```
/* ======================================= */
/* ========== Compute Loss Curve ========== */
/* ======== for an Elementary Video Stream ========= */
/* ======================================= */
```

/* INIT. $B$ holds the available buffer, $L_B$ holds the sum of the unrestricted queue sizes of the busy
periods with loss at the time instants at which the maximum queue occurs, $n_l$ holds the number
    of busy periods with loss, $n_b$ the number of busy periods, and $n_a$ the number of active periods.*/

1.1  $B \leftarrow \infty$ ; $L_B \leftarrow 0$; $n_l \leftarrow 0$; $M \leftarrow$ stream_size;

/* Compute busy periods for rate $\rho$, and buffer size $B$. */

1.2  process_active_periods($1, n_a, B$);

/* Insert into the heap the buffer point at which a loss occurs
    for each busy period, compute the buffer size for the first break for
    each busy period and insert it into the heap as well. */

1.3  For $b = 1$ to $n_b$  /* for each busy period $b$ */

1.3.1  heap_insert($Q_b^*$, LOSS, $b$);

1.3.2  $B' \leftarrow$ compute_next_break($b$);

1.3.3  heap_insert($B'$, BREAK, $b$);

1.4  endfor

2  /* Extract the maximum buffer from the heap, and process
    the corresponding busy period until the heap becomes empty. */

2.1  ($b, B$, cause) $\leftarrow$ heap_extract_max();

/* Let $(s_p, t_p), (s_{p+1}, t_{p+1}), ..., (s_q, t_q)$ be the active periods contained within the busy period $b$.
    Also, let $(s_p, t_p), ..., (s_j, t_j)$ be the active periods contained within the interval ($\alpha_b, \tau_b$). */

2.2  If (cause = LOSS)

/* update $n_l$ and $L_B$ variables */

2.2.1  $L_B \leftarrow L_B + ( \Sigma_{i=p}^{j} r(t_i - s_i) - \rho(t_j - s_p) )$;

2.2.2  $n_l \leftarrow n_l + 1$;

2.3  else  /* cause = BREAK */

/* update $n_l$ and $L_B$ variables */

2.3.1  $L_B \leftarrow L_B - ( \Sigma_{i=p}^{j} r(t_i - s_i) - \rho(t_j - s_p) )$;

2.3.2  $n_l \leftarrow n_l - 1$;

/* Process the break in busy period $b$: Compute the new busy periods, and update $n_l$ and $L_B$
    when a busy period already experiences loss. For the remaining new busy periods, insert
    into the heap the buffer points at which the first losses occur. Finally, for all the new
    busy periods, compute the buffer sizes for the first break and insert them into the heap. */

2.3.3  process_break($b, B$);

2.4  endif

2.5  output_point($B, [(L_B - n_l B)/(M)]$);

2.6  If (heap not empty)

2.6.1  goto Step 2;

2.7  endif

/* Output the last point of the loss curve */

2.8  Output $(0, [(r - \rho)/(r)])$;

2.9  STOP;

FIG. 5

METHOD FOR DETERMINING LOSS RATE OR A LOSS CURVE OF A VIDEO SOURCE OR MULTIMEDIA TRAFFIC

CROSS-REFERENCE TO RELATED APPLICATIONS

This application claims priority from U.S. provisional application Ser. No. 60/171,669 filed on Dec. 20, 1999 and incorporated herein by reference.

STATEMENT REGARDING FEDERALLY SPONSORED RESEARCH OR DEVELOPMENT

This invention was made with Government support under Grant No. MIP-9257103, awarded by the National Science Foundation. The Government has certain rights in this invention.

REFERENCE TO A MICROFICHE APPENDIX

Not Applicable

BACKGROUND OF THE INVENTION

1. Field of the Invention

The present invention pertains generally to the characterization of multimedia traffic sources and more particularly to a method of determining loss curves for multimedia traffic sources utilized within a packet network environment.

2. Description of the Background Art

The explosive growth of the Internet has spawned a number of video-based services which operate over packet networks, such as streaming video and video-on-demand. These applications often require, or can benefit from, an ability to provide Quality-of-Service (QoS) guarantees for the network. The QoS guarantees are usually in the form of bandwidth, end-to-end delay, and/or the loss rate experienced by the traffic stream. The rate variability of these video sources has introduced the need for characterizing the associated traffic so that resources within the network, such as bandwidth and buffer space, may be properly allocated during the call admission control (CAC) process. Traffic characterization also allows for the efficient policing of the traffic sources. Two of the primary resources allocated within the network are the transmission rate $\rho$ and the buffer size B. In an application where no losses are allowed, the video source can be characterized completely by determining the minimum buffer size necessary to avoid losses as a function of the rate $\rho$, and is referred to as the burstiness curve.

If the application can tolerate some amount of loss, the amount of bandwidth and/or buffer space required within the network can often be reduced significantly, since the burstiness curve of the source typically exhibits a long tail. The problem of determining the amount of network resources to allocate then becomes the problem of choosing a specific vector from the three-dimensional space $(\rho, B, \epsilon)$. In order to simplify the problem, either the transmission rate $\rho$ or the buffer size B can be fixed and the corresponding curves calculated. The $\epsilon$ versus B curve for a specific video source transmission rate $\rho$ enables the estimation of the loss rate resulting from a given buffer size. A plot of the loss rate as a function of the buffer size for a given rate $\rho$ is referred to as the loss curve of the associated source at the given rate $\rho$.

BRIEF SUMMARY OF THE INVENTION

The present invention provides efficient methods for determining and quantifying the effect of the variability of multimedia traffic sources into the loss characteristics of a multimedia traffic source. The loss curve of a multimedia traffic source characterizes the loss rate generated by the source as a function of the allocated buffer size for a given transmission rate. The loss curve is useful in the optimal allocation of resources When the traffic source is transmitted over a packet network, so that allocation tradeoffs between loss rate, bandwidth, and buffer space may be intelligently determined within the network. A deterministic method is taught which can provide an exact computation of the entire loss curve of traffic sources, such as elementary video streams, and MPEG-2 transport streams. The method exploits the piecewise linearity of the loss curve and computes only the points at which the slope of the loss curve changes, therefore, the method is capable of exactly characterizing the loss curve with the minimum number of points. The described methods have a small memory requirement while providing rapid execution times, for example, the entire loss curve of a two-hour elementary video stream was determined by an embodiment of present method in approximately 11 seconds on a Sun Ultra-2™ workstation. The efficiency of the methods taught within the present invention are suitable for both off-line and on-line QoS provisioning in networked multimedia environments.

An object of the invention is to provide an efficient method for determining an exact loss curve for a traffic source.

Another object of the invention is to provide a method specifically tailored to the determination of loss curves for use with both elementary video streams and MPEG-2 transport streams.

Another object of the invention is to provide a method which exploits the piecewise linearity of the loss curves so as to reduce the necessary computational resources.

Another object of the invention is to provide a method in which the minimum number of subject points need be identified during computation for the level of accuracy desired.

Another object of the invention is to provide a method of determining loss curves which is computationally space-efficient.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 2 is pseudocode for determining active periods for a traffic stream according to an embodiment of the present invention.

FIG. 5 is pseudocode for determining the loss curve for a traffic stream according to an embodiment of the present invention.

DETAILED DESCRIPTION OF THE INVENTION

Referring more specifically to the drawings, for illustrative purposes the present invention is embodied in the apparatus generally shown in FIG. 1 through FIG. 9. It will be appreciated that the apparatus may vary as to configuration and as to details of the parts, and that the method may vary as to the specific steps and sequence, without departing from the basic concepts as disclosed herein.

Traffic streams are increasingly being communicated over packet networks such as the Internet. One form of multimedia that is commonly communicated over the Internet is video which is typically transported over a packet network as an elementary video stream consisting of a sequence of frames generated at a fixed rate (frame period), which may be of varying sizes due to scene changes. An embodiment of the methods according to the present invention is presented for providing an exact determination of loss and loss curves for an elementary video stream.

Figure 1:
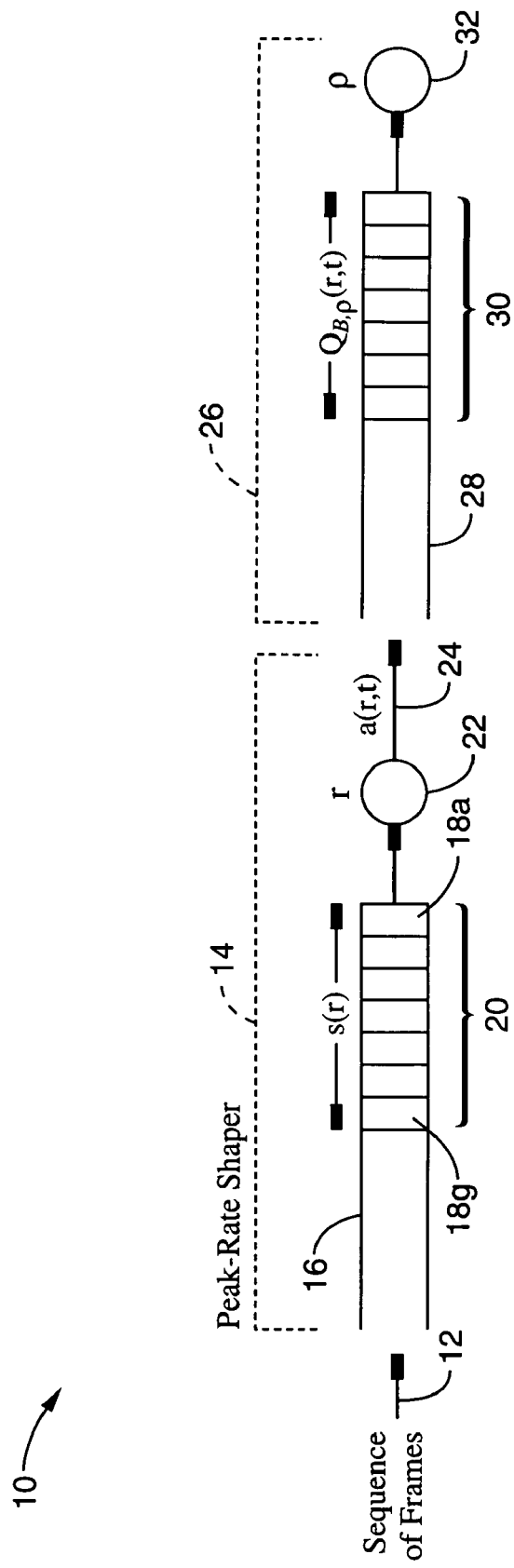
FIG. 1 is a schematic of a data-flow model utilized for determining the loss curves of a traffic source according to an embodiment of the present invention.

FIG. 1 shows a data-flow model 10 utilized for computing the loss curve for an elementary video stream. The traffic stream 12 is sequenced through a peak-rate shaper 14 comprising an input queue mechanism 16 within which a new time sequence for the bit-stream of the input traffic is created. A small sequence of frames 18a–18g is presently shown represented within the queue 16. In response to different values of the peak rate r, the maximum queue depth 20, denoted by s(r), within input queue 16 of peak-rate shaper 14 will vary. Frames are removed from input queue 16 by an output 22 of the traffic stream at a rate r. The bit-stream 24 at the output of peak-rate shaper 14, denoted by a(r,t) is also dependent on the peak rate r. The present invention provides a method for computing the loss curve of the traffic source at the output of the peak-rate shaper 14 for a specific transmission rate ρ and buffer size B.

According to the model 10, the traffic stream output 24 a(r,t) then enters a secondary shaper 26, having a secondary queue 28, with a maximum queue length 30 wherein frames are output at a deterministic output rate 32, denoted by ρ, for a given buffer size B. By recording the amount of data lost from this second buffer in response to different buffer sizes, the loss curves for the source can be obtained for the given peak rate r and transmission rate ρ. The B versus ρ curve for a given maximum acceptable loss rate ϵ is then obtained by constructing a series of loss curves for different choices of the rate ρ and reading off the associated B values corresponding to the given loss rate.

The amount of video traffic within the video stream which is lost over the time interval [0,t] is defined as $L_{B,\rho}(t)$. The fraction of lost traffic, or the loss rate $\epsilon(B,\rho)$, is therefore given by:

$$\varepsilon(B, \rho) = \frac{L_{B,\rho}(T)}{M} \quad (1)$$

where M indicates the total number of bits in the elementary stream with T being the duration. To plot a complete loss curve for a given rate ρ, it is only necessary to consider the range of buffer sizes $0 \leq B \leq \sigma(\rho)$, where $\sigma(\rho)$ is the maximum burstiness of the source at rate ρ. For a complete characterization of the source, a series of loss curves can thereby be constructed for different transmission rates in the range $0 < \rho < r$. To complete the definition of the loss curve, the loss rate for the boundary values of B and ρ is defined as follows:

$$\epsilon(B, \rho) = 0, \ B > \sigma(\rho) \quad (2)$$

$$\varepsilon(0, \rho) = \frac{r - \rho}{r}, \quad 0 \leq \rho \leq r \quad (3)$$

$$\epsilon(B, 0) = 1, \ 0 \leq B \leq M \quad (4)$$

$$\epsilon(B, 0) = 0, \ B \geq M \quad (5)$$

To analyze the behavior of the queue at the second shaper in FIG. 1, the on-off signal at the output of the peak-rate shaper must first be characterized. The "on" periods of the signal are referred to as "active-periods" and a computation method is presented to determine these active periods for the bit-stream a(r,t) at the output of the peak-rate shaper for the traffic source. Information about these active periods is then utilized in the computation of the loss curve.

The active period is defined as a maximal period of time during which the peak-rate shaper is continuously transmitting traffic, which corresponds to an on-period of the signal a(r,t). Letting $n_a(r)$ denote the number of active periods of the signal for a peak rate of r, $s_i^r$ the time instant at which the ith active period commences, and $t_i^r$ the time when it ends. The active periods $(s_i^r, t_i^r)$, of the traffic stream for $1 \leq i \leq n_a(r)$ are computed.

Assuming that the number of frames in the video trace is N, the length of the trace is T, the frame rate is f, and the size of the ith frame is $d_i$ bits, the maximum frame size in the trace can be defined as $d_{max} = \max_{1 \leq i \leq N} d_i$. In addition, it is assumed that a frame is added instantaneously to the queue of the peak-rate shaper at the end of the corresponding frame period, such that the first frame arrives in the queue at time 1/f, which marks the beginning of the first active period. When the peak rate r satisfies $r \geq d_{max}/f$, it becomes simple to compute the active periods of the signal a(r,t).

$$s(r) = d_{max}, \ n_a(r) = N, \ s_i^r = \frac{i}{f}, \text{ and } t_i^r = s_i^r + \frac{d_i}{r} \quad (6)$$

However, in the general case when $r < d_{max}/f$, neighboring frames overlap with each other in the shaper queue, leading to larger maximum queue lengths and a smaller number of active periods. Letting $q_i(r)$ represent the size of the queue at the input of the peak-rate shaper following the arrival of the ith frame. It will be appreciated that the maximum queue length always occurs immediately after the arrival of a frame, and is given by:

$$s(r) = \max_{1 \leq i \leq N} q_i(r) \quad (7)$$

The active periods of the elementary stream can be determined by traversing the sequence of frames and computing the queue size at the instant subsequent to the arrival of each frame.

FIG. 2 is the pseudocode for determining the active periods for a given value of the peak rate r and it processes the individual frames of the elementary stream in sequence and computes the maximum queue size s(r), the number of active periods $n_a(r)$, and the starting and ending times of each active period $(s_i^r, t_i^r)$, $1 \leq i \leq n_a(r)$.

Information about the active periods of the signal a(r,t) can be utilized to compute the loss curve of the original video stream by observing the queue behavior at the input of the second shaper 26 shown in FIG. 1. A method is described for determining the loss curve for a specific service rate ρ. For the sake of simplicity, the parameter r is omitted from the notations in the remainder of the discussion as it remains constant.

The peak-rate shaping procedure produces a sequence of active periods for a given peak-rate r. If the output rate of the peak-rate shaper is denoted by m(t), then:

$$m(t) = \begin{cases} r, & t \in [s_i, t_i] \\ 0, & \text{otherwise} \end{cases} \quad (8)$$

The maximal period of time during which the queue of the second shaper in FIG. 1 remains non-empty is then defined as a busy period. The notation $\alpha_i, \beta_i$, is utilized to represent, respectively, the starting and ending times of busy period i. For a given sequence of active periods, the corresponding busy periods are a function of the transmission rate ρ and the buffer size B at the input of the second shaper 26.

Figure 3A:
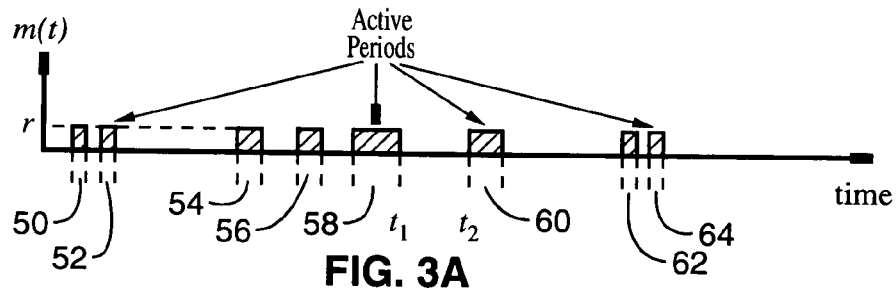
FIG. 3 is a graph of busy periods within an exemplified portion of a traffic stream for various values of buffer size B according to an aspect of the present invention.
Figure 3B:
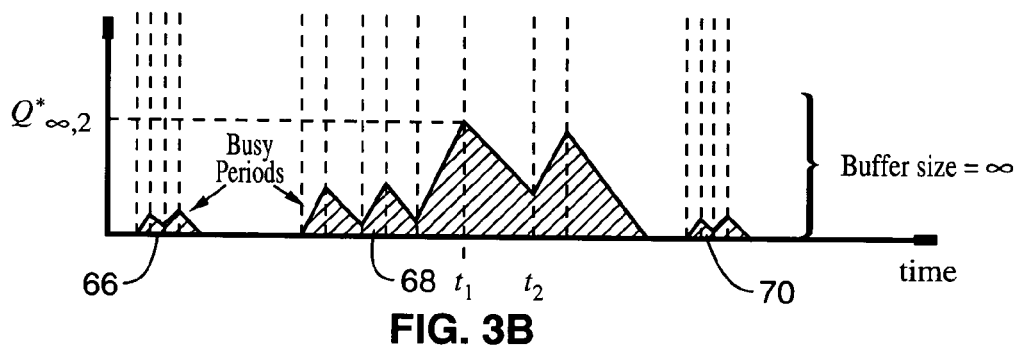

FIG. 3A shows an example of eight active periods, 50 through 64, within a portion of an elementary video stream and it corresponds with FIG. 3B depicting three busy periods 66, 68, 70 associated with the active periods of FIG. 3A when no buffer size constraints have been imposed.

Assuming no losses from the buffer, the local maximum queue size is denoted by $Q_{B,i}^*$ for busy period i, a buffer size B, and a time $\tau_{B,i}$ at which the local maximum occurs. For simplicity, the subscript B is omitted when the buffer size is obvious from the context. The present method for characterizing the loss curve of the traffic source comprises two key observations:

1. for a given transmission rate ρ, the loss rate ε is a piecewise-linear function of the buffer size B, such that as the buffer size is decreased, the slope of the loss curve can change only when,
   (i) a busy period starts to experience losses for the first time, or
   (ii) a busy period breaks into two or more constituent busy periods, thereby enabling the exact computation of the loss curve by identifying the points at which such events occur;
2. within each busy period where a loss occurs, the last time instant at which a loss occurs is the time instant $\tau_{B,i}$ at which the maximum queue size occurs.

The loss curve of the source, for a given transmission rate ρ, can be constructed by considering various values of the buffer size B in the range $0 \leq B \leq \sigma(\rho)$, and computing the loss rate for each of these cases. This procedure, however, provides only an approximation of the actual loss rate between the points considered and it requires a simulation of the queue for each incremental buffer size. The present invention, by contrast, exploits the piecewise-linearity of the loss curve by computing the slope of the loss curve at positions where the slope changes. Therefore, a simulation of the queue is avoided because only the changes in the busy periods of the queue are tracked with a change in buffer size. As a result of limiting the points of interest to those at which curve deflection may occur, the present method provides an efficient loss curve computation method capable of determining exact loss curves comprising a minimum number of points and associated computations.

Figure 3C:
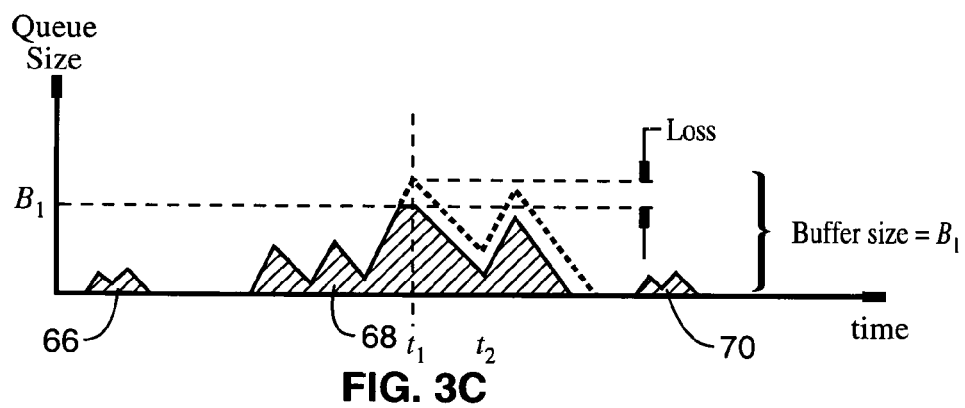

A change in the number of busy periods experiencing losses constitutes the only case in which the slope of the loss curve may change as the buffer size B is decreased towards its minimum value of zero. FIG. 3A shows the active periods 50 through 64 of the input signal which are mapped into FIG. 3B as three busy periods 66, 68, 70, generated for a model having an infinite buffer size. The global maximum queue size occurs in the second busy period 68 and is denoted by $Q_{\infty,2}^*$. As the buffer size B is decreased, losses do not begin to occur until the queue size for this example drops to below the global maximum queue size $Q_{\infty,2}^*$. As the queue size is further decreased to a value $B_1 < Q_{\infty,2}^*$, as shown in FIG. 3C, losses occur in the second busy period 68. If the peak at time $t_1$ corresponding to the end of active period 58 is the only peak experiencing losses, the total amount of lost traffic is equal to $(Q_{\infty,2}^* - B)$, which is a linear function of B. It should also be appreciated that no losses can occur to the right of $t_1$ in the same busy period.

Figure 3D:
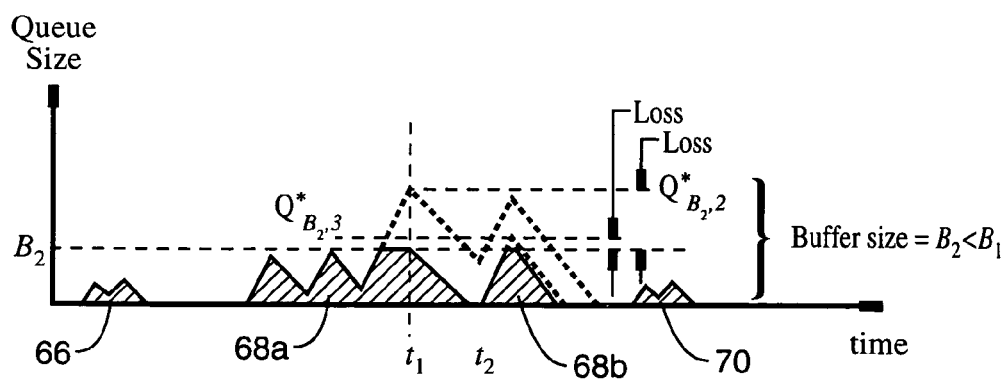

On further decreasing the buffer size to $B_2 < B_1$, as shown in FIG. 3D, the second busy period 68 splits into two busy periods 68a, and 68b, with the break occurring at time $t_2$. After the split, both resultant busy periods 68a, 68b, experience losses, wherein the total amount of lost data is equal to $(Q_{B2,2}^* - B) + (Q_{B2,3}^* - B) = (Q_{B2,2}^* + Q_{B2,3}^*) - 2B$, where $Q_{B2,2}^*$ and $Q_{B2,3}^*$ are the corresponding local maximum queue sizes of the new busy periods 68a and 68b, respectively, as indicated in FIG. 3D. Therefore, the amount of lost data is again a linear function of B, and its slope is determined by the number of busy periods during which losses are experienced.

For a video stream of finite duration, the values of the buffer size B that cause either a loss in a busy period with no prior loss, or a break in a busy period that already experiences loss, form a finite set. It will be appreciated that only the values of B belonging to this set need be computed to exactly determine the loss curve, since the loss curve is piecewise linear between adjacent buffer points belonging to this finite set. Allowing $A(t_1, t_2)$ to denote arrivals into the buffer during the interval $[t_1, t_2]$, and the number of bits lost in the interval $[t_1, t_2]$ to be given by $L_{B,\rho}(t_1, t_2)$ when the buffer size is B and the transmission rate is ρ. For simplicity, in the special case when $t_1 = 0$ and $t_2 = t$, the notation $L_{B,\rho}(t)$ is utilized instead of $L_{B,\rho}(t_1, t_2)$. For a given busy period in which losses are experienced, the amount of loss increases linearly with a slope of (−1) as the buffer size B is decreased, insofar as the busy period does not subdivide into multiple busy periods. In view of these observations, the piecewise linearity of the loss curve can be illustrated.

Lemma 1—Letting $\gamma_i$ represent the last instant at which a loss occurs within busy period i, the amount of data lost during the busy period is given by:

$$L_{B,\rho}(\alpha_i,\beta_i)=A(\alpha_i,\gamma_i)-\rho(\gamma_i-\alpha_i)-B \quad (9)$$

where $\alpha_i$ is the starting time of the busy period i.

Proof—The losses from the queue during the interval $(\alpha_i,\gamma_i)$ must be equal to the arrivals into the queue during the interval minus the total traffic transmitted during the interval, minus the bits remaining in the buffer at the end of the interval. Since the queue does not underflow during the interval $(\alpha_i,\gamma_i)$, the total traffic transmitted during the interval $(\alpha_i,\gamma_i)$ is $\rho(\gamma_i-\alpha_i)$. Furthermore, since losses occur at time $\gamma_i$, the buffer occupancy at time $\gamma_i$ is B. Subtracting these two terms from the bit arrivals results in the equation Eq. 9.

Therefore, in order to calculate the losses during the busy period, it is sufficient to determine the starting time of the busy period and the last instant $\gamma_i$ at which losses occur during the busy period. Note also that $\gamma_i$, must coincide with the end of an active period of the source. It will be subsequently shown that $\gamma_i$ coincides with the time instant at which the local maximum queue size would have occurred during the busy period if the buffer size were infinite. Lemma 1 may be utilized to show that the loss curve is piecewise linear.

Lemma 2—For a given transmission rate $\rho$, the loss curve of an elementary video stream is piecewise linear. The slope of the curve changes only at values of the buffer size B where one of the following events occurs:

1. the number of busy periods changes within which losses occur;
2. the last instant at which a loss occurs $\gamma_i$ in a busy period i shifts for any busy period i.

Proof—Consider two distinct values of B, $B_1$ and $B_2$, with $B_1<B_2$, such that (i) the number of busy periods undergoing losses remains the same at $B_1$ and $B_2$; and (ii) the last instant at which a loss occurs in each of these busy periods, $\gamma_i$, also remains the same. Letting $S_1$ denote the set of busy periods in which losses occur, then according to Lemma 1 the total amount of lost data over the entire duration T of the video stream is given by:

$$L_{B,\rho}(T) = \sum_{i \in s_i} (A(\alpha_i, \gamma_i) - \rho(\gamma_i - \alpha_i)) - n_l B, \quad B_1 \le B \le B_2 \quad (10)$$

where $n_1$ is the number of busy periods in the set $S_1$. As a result, the plot of $L_{B,\rho}(T)$ and therefore that of $\epsilon(B,\rho)$ with respect to B in the range $B_1 \le B \le B_2$ is a straight line segment with slope $-n_1$.

The entire loss curve of the elementary video stream for a given transmission rate $\rho$ may therefore be obtained by starting from a buffer size equal to the corresponding burstiness value $\sigma(\rho)$, which is equal to the global maximum queue size when the buffer size is infinity, and progressively considering successive buffer sizes at which either (i) a busy period with no prior loss starts to experience losses, or (ii) a busy period experiencing loss breaks into smaller busy periods. The time instant at which the last loss occurs within a given busy period is the time at which the queue size reaches its local maximum within the busy period, when no losses occur from the buffer. The aforementioned procedure provides a simple method of determining the parameter $\gamma_i$ in Eq. 10 preceeding a loss rate computation.

The size of the buffer at the instant at which the first loss occurs during a busy period can easily be identified by computing the local maximum queue size within the busy period while ignoring any losses. The size of the buffer at the instant that a break occurs in a busy period, however, is more difficult to identify. The starting instants of active periods within a busy period are the points at which a break may potentially occur, because the queue size reaches local minimums at the start of active periods. Therefore, the maximum buffer size at which a break occurs within the busy period may be determined by computing the buffer size that causes the queue size to be zero at each of these points and selecting the maximum among all the points. This above procedure, however, is cumbersome because the effect of losses must be accumulated over multiple active periods to determine the buffer size at which the queue size reaches zero exactly at the start of a given active period. An enhanced method is thereby provided which identifies the buffer size at which a break in the busy period occurs.

Figure 4:
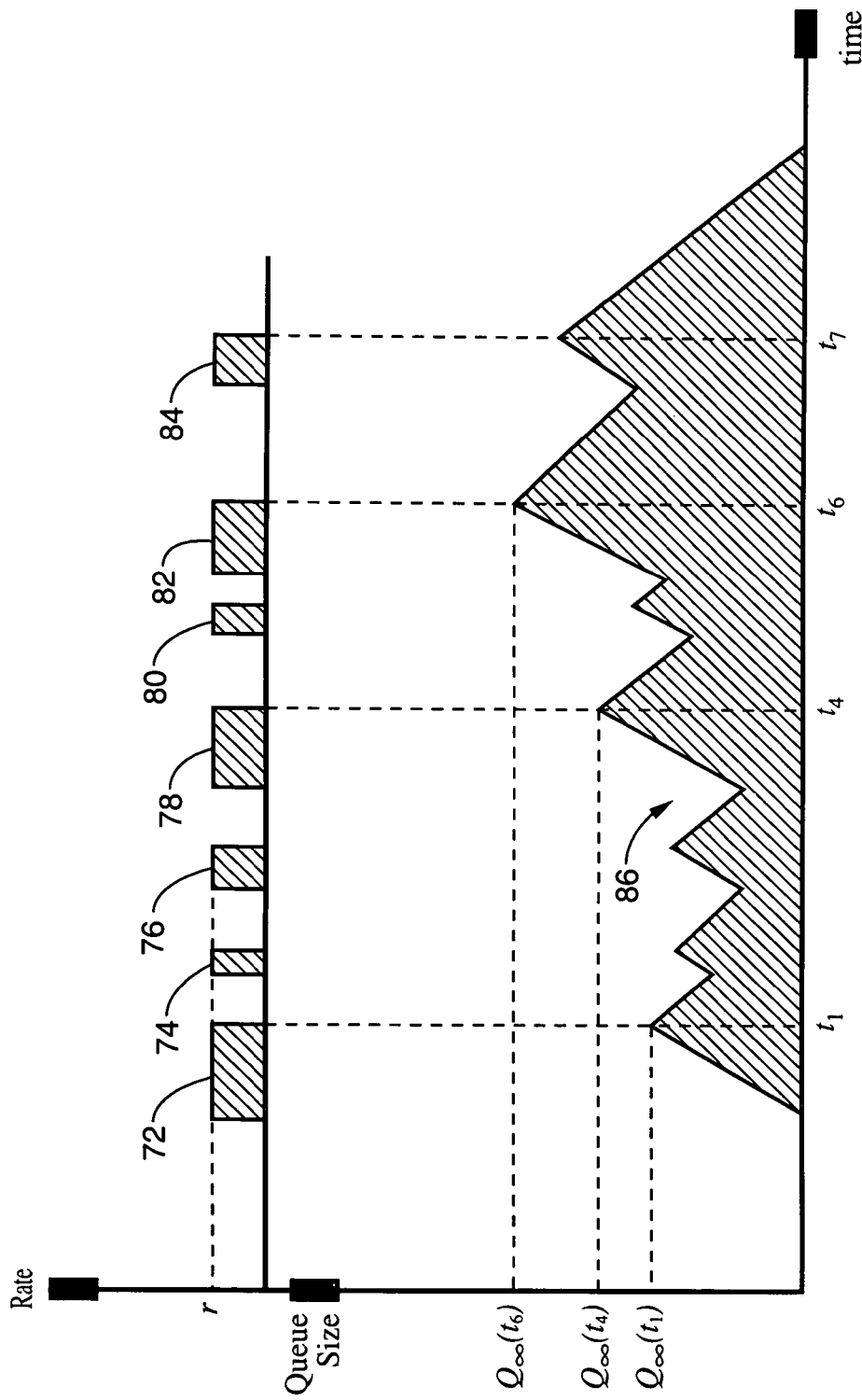
FIG. 4 is a graph of active periods within an exemplified portion of a traffic stream along with associated queue sizes according to an aspect of the present invention.

FIG. 4 illustrates an example of the enhanced approach wherein seven active periods 72 through 84 result in a single busy period 86. The peaks and valleys of the queue depth within the busy period 86 correspond to the ending and starting times, respectively, of the active periods 72 through 84. The illustrated busy period is shown for an unlimited buffer size wherein no losses occur and the maximum depth of the queue occurs at time $t_6$, which corresponding to the end of the sixth active period 82. As the buffer size is decreased from infinity, losses start to occur first during the sixth active period 82, which causes a corresponding dip in the valleys following the peak at $t_6$, resulting in a break in the busy period 86 if the queue size drops to zero at any of the valleys.

As buffer size decreases, the attendant losses start to occur progressively from the highest peak, to the next highest, and so on. In addition, if a loss occurs from one of the peaks within the busy period, no losses can occur from a following peak unless the latter is larger than the former, or the busy period breaks. For example, in FIG. 4 no losses can occur between the peaks at $t_1$ and $t_4$ without first causing a break in busy period 86. The present procedure utilizes this observation by processing only the active periods which correspond to monotonic queue size increases within the busy period wherein subject buffer sizes are identified at which a break may occur.

The method of identifying the buffer size at which a break may occur in the busy period involves constructing a sequence of active periods S within a busy period having monotonically increasing queue sizes and including as part of the sequence the last active period. For busy period 86 exemplified in FIG. 4, the sequence consists of the active periods 72, 78, 82, 84. Starting from the end of the sequence, potential break points are then examined for a break in the busy period. For each active period within the sequence, the buffer size is identified at which the depth of the queue reaches zero within the interval between the current active period and the previous active period of the sequence. For instance, in relation to FIG. 4, the procedure first determines the buffer size at which the queue size will reach zero at the valley between $t_6$ and $t_7$, which expresses the difference between the queue sizes at $t_6$ and the following valley. After reducing the buffer size, if the buffer size exceeds the next peak being considered in the sequence, the peak at $t_4$ as per this example, a break will result between $t_6$ and $t_7$ before any losses occur at time $t_4$, and no further processing of the sequence is necessary. If the peak at time $t_4$ is less than the identified buffer size, however, the procedure determines the concomitant buffer size associated with a break occurring between $t_4$ and $t_6$. The aforementioned process continues until a peak which exceeds the currently identified buffer size is located, or the sequence of active periods in S is exhausted, wherein the buffer size is chosen as the last identified point at which the break occurs.

FIG. 5 illustrates high-level pseudocode for determining the loss curve according to the present invention and commences by computing busy periods when the buffer size B is infinite. A function process_active_periods( ) processes the active periods 1 to $n_a$ in order to determine the set of busy periods, after which it records all buffer size points, and associated cause, at which any busy period starts experiencing loss. Each of these recorded buffer points correspond to a maximum queue size for each of the busy periods and the function computes and records the maximum buffer sizes at which each busy period breaks. In the iteration of step 2 within the pseudocode, the recorded maximum buffer points are retrieved and processed. Each of these buffer points is associated with a busy period b along with an associated cause which comprises either of two cases, (1) LOSS—wherein a loss in the busy period b occurred, and (2) BREAK— wherein a break in the busy period occurred. For the LOSS case the cause is a loss in the busy period, and the procedure updates the loss variables ($L_B$ and $n_1$ variables) that are used in the computation of the total loss for the current value of the buffer size, and the total amount of loss is given by ($L_B - n_1 B$). In the case of a break cause, the function updates the loss variables again and then processes the break by calling a function process_break( ) which commences by computing new busy periods generated after the break of busy period b, which are each checked for possible losses. For each busy period within which a loss is experienced the function updates the set of loss variables. Furthermore, the function records the maximum buffer size associated with the new busy periods at which losses commence within the busy periods. The procedure then determines and records the buffer sizes associated with the first break within the set of all generated busy periods. To avoid the output of multiple points at the same buffer size value the function outputs a (B,$\epsilon$) pair only when a new buffer size is processed by calling the function output_point( ). The aforesaid procedure repeats for each new maximum buffer point and associated busy period which has been recorded, and terminates after all recorded buffer points have been processed. The loss curve may then be plotted by interconnecting the loss ratio ($\epsilon$) values at each buffer point with linear segments.

The worst-case time and space complexities of the method may be determined by considering the computations performed at each of the requisite buffer points. The number of buffer points is given by $O(n_a)$, where $n_a$ is the number of active periods, since a buffer point corresponds to either a break or a loss occurring in a busy period. The number of steps to process a busy period for a specific buffer size B is also given by $O(n_a)$. In calculating the number of periods and steps, the time to compute any new busy periods and the buffer size values at which either a loss or a break occurs in each of these busy periods has been included. Therefore, the total worst-case time complexity for the execution of the method is given by $O(n_a^2)$. The space-complexity, as defined by the space required for storing the outputs are proportional to the number of buffer points processed by the method, and are therefore also given by $O(n_a)$.

The loss curve which has been determined by the method can be utilized for computation of a B versus $\rho$ curve, for instance, a plot of the minimum buffer size B in relation to the service rate $\rho$ for a given specific loss rate $\epsilon$. In plotting a B versus $\rho$ curve, a determination is made of the loss curve for every $\rho$ and the associated values for B are then plotted for each specified value of $\epsilon$. The aforementioned procedure may be performed with any desired level of granularity for the rate $\rho$, or alternatively performed at rate points associated with the burstiness curve for the stream.

The preceding example focused on the determination of loss curves within an elementary video stream, however, the present invention is applicable to any form of traffic stream within a packet based network. In a further example, the inventive methods are applied to an MPEG-2 transport stream. The MPEG-2 transport stream format comprises a grouping of one or more programs within a single stream, each program being defined as a grouping of elementary streams (audio, video, teletext, and so forth) which have a common time-base for delivery. The MPEG-2 transport stream is currently a preferred choice for communicating multimedia streams within error-prone environments such as exist within today's packet-switched networks. A basic characteristic of the MPEG-2 transport stream format is that the throughout rate of the stream is piecewise constant, as a result, the MPEG-2 transport stream comprises a sequence of constant-rate segments which are exemplified within FIG. 6.

Figure 6:
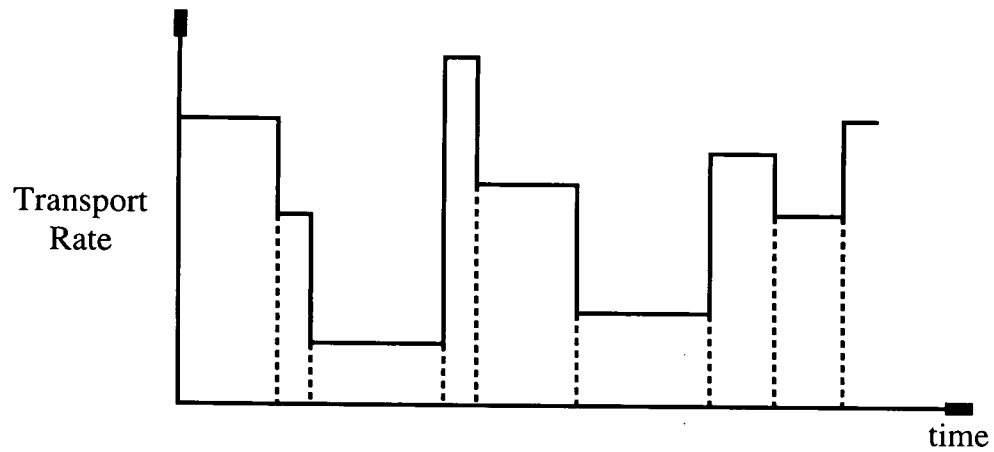
FIG. 6 is a graph of transport rate within an exemplified portion of an MPEG-2 transport stream according to an aspect of the present invention.

Referring to FIG. 6, it will be appreciated that the same definition for the busy period may be utilized with MPEG-2 transport streams, wherein a busy period commences at the beginning of a rate segment i at which $r_i > \rho$, wherein $r_i$ is given as the rate of the segment.

Figure 7:
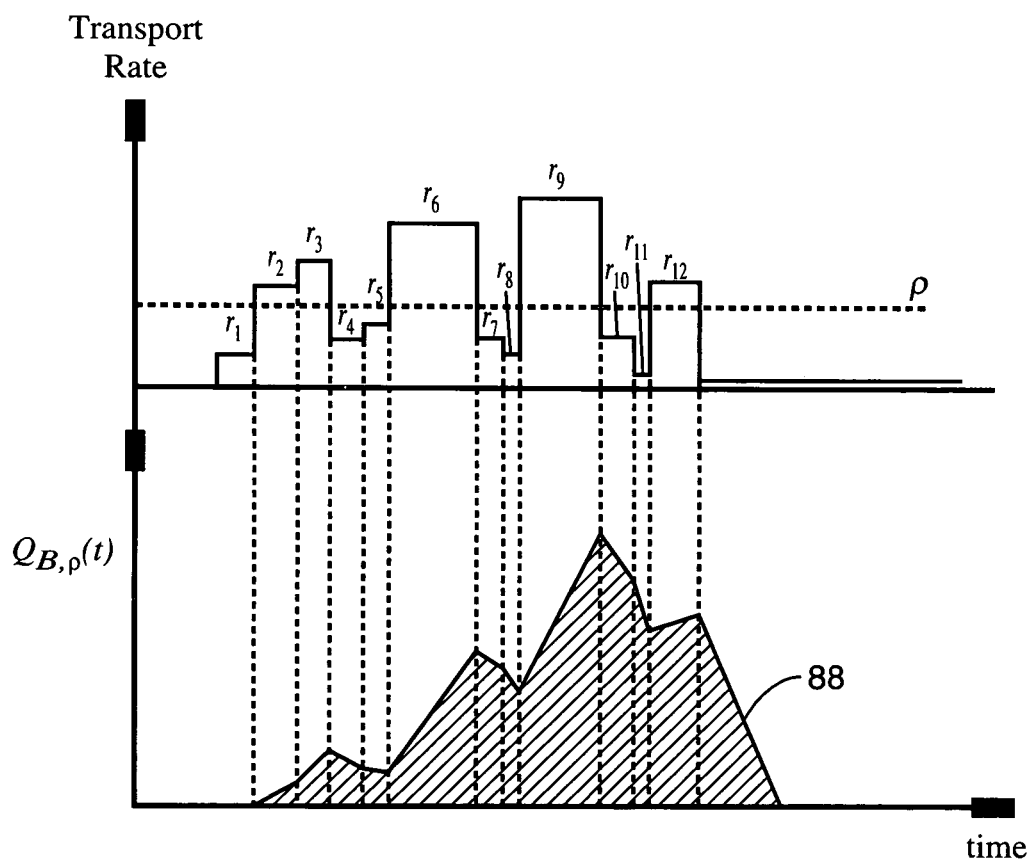
FIG. 7 is a graph of busy periods within an MPEG-2 transport stream according to an aspect of the present invention.

FIG. 7 exemplifies a portion of an MPEG-2 transport stream having rate segments $r_1$ through $r_{12}$ and an associated busy period 88. Homologous to the case of elementary video streams, the amount of data lost in a busy period is given by Eq. 8, where m(t) corresponds to the transport rate of the MPEG-2 transport stream. Similarly, the total losses throughout the whole stream is given by Eq. 9. Therefore, in computing the exact loss curve in the transport stream case, only the buffer points need be considered at which either (i) a change occurs in the index of the last rate segment experiencing loss within a busy period, or (ii) a change occurs in the number of busy periods that experience a loss. Computation of the next buffer size at which a break occurs within a given busy period is performed differently for MPEG-2 transport streams than within elementary video streams. Computed first are the set of rate segments that provide increasing peaks of the queue size, these increasing peaks can occur at the ends of any particular rate segment. Within a busy period, the time instants necessitating a check for a possible break comprise only those instants of time which correspond to valleys which exist within the busy period and do not include all time instants which correspond to the end of decreasing line segments within the busy period. As an example of determining possible breaks within a busy period consider that the rate segments $r_3$, $r_6$, and $r_9$ of FIG. 7, are inserted into the set of increasing queue peaks, whereupon it is sufficient to examine the valley points pursuant to rate segments $r_4$, $r_8$, and $r_{11}$, in determining buffer sizes associated with a first break in the busy period.

Figure 8:
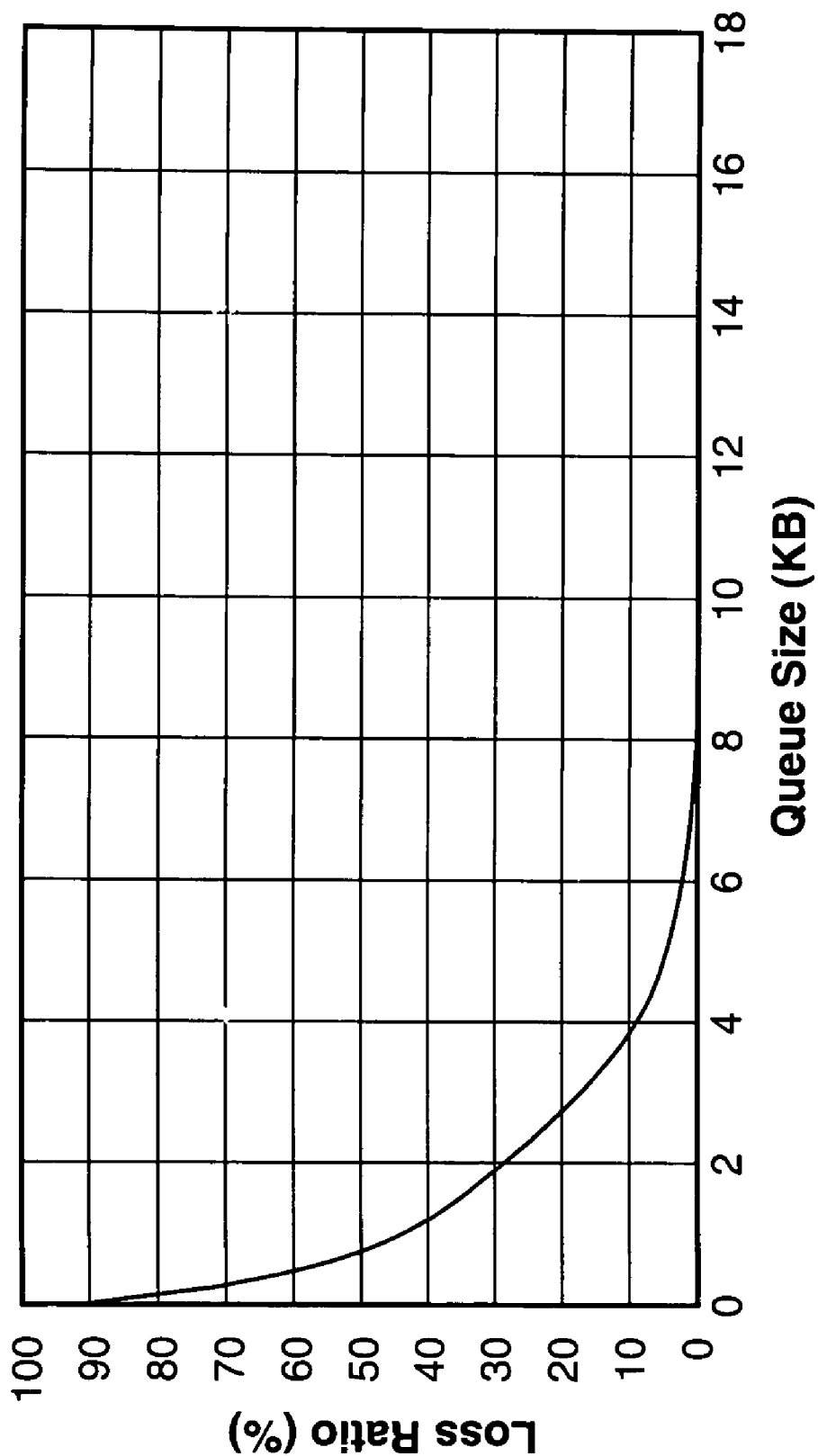
FIG. 8 is a graph of the loss curve for a "Lambs" trace determined according to an embodiment of the present invention.
Figure 9:
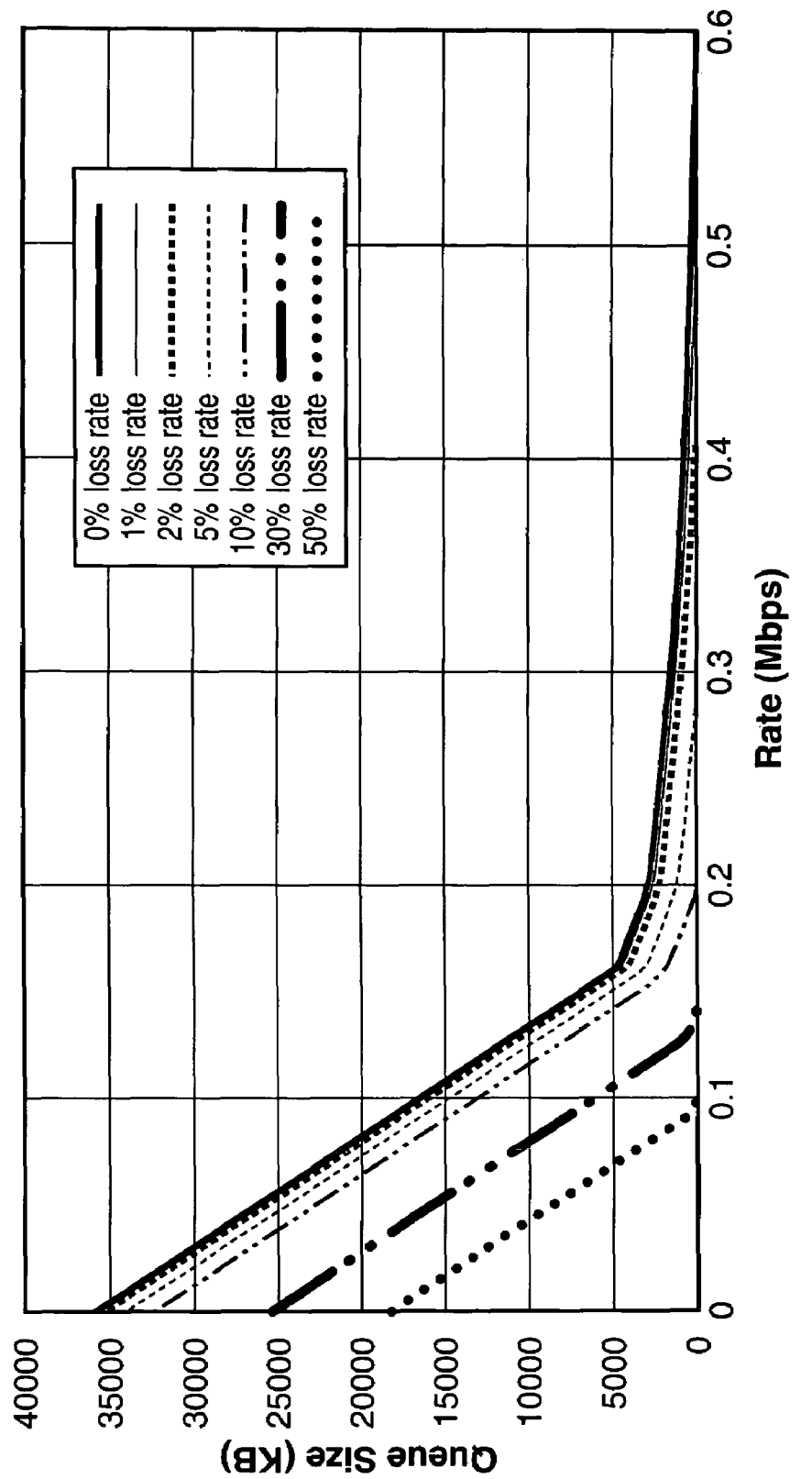
FIG. 9 is a graph of B versus ρ for the "Lambs" trace shown in FIG. 8.

Traces were characterized for loss according to the present methods to determine the efficiency of the methods on real-world traffic communicated over the Internet. The traces were provided as elementary video streams, however, it will be appreciated that MPEG-2 transport streams, and other traffic stream formats are expected to show similar efficiency results. The present loss curve determination methods were applied to a number of elementary video stream traces each comprising a segment of approximately 30 minutes in duration, with the exception of the "Garrett's" trace which contained a segment of approximately 120 minutes duration. The long "Garrett's" trace was created by Mark Garrett for his thesis entitled "*Contributions Toward Real-Time Services On Packet-Switched Networks*", and consists of 174,136 frames with a frame rate or 24 Hz. Table 1 illustrates execution times for the method according to the preferred embodiment in determining loss curves applied to the associated traces which were obtained from a variety of video programming sources, which included movie segments, such as "Mr. Bean", and "Silence of the Lambs" in addition to television programming, such as network news programs and "The Simpsons". It will be appreciated that the execution times, in toto, are relatively small for the present method, and that loss was determined for each of these traces within a few seconds when executed on a Sun Ultra-2™ workstation. The number of points on the loss curve varied from 9,632 for the "Lambs" trace up to 89,489 for the "Garrett's" trace, which was comparable to the total number of frames in the respective traces. FIG. 8 illustrates a loss curve and FIG. 9 illustrates a typical B versus ρ curve which were determined for the "Lambs" trace according to the present invention.

Accordingly, it will be seen that this invention provides an accurate and rapid method for determining loss and loss curves for traffic sources being communicated over packet networks. The described methods may be implemented within a variety of computers and communication related equipment which contain computational resources. The method for determining loss and loss curves was exemplified within the description for use with both elementary video streams as well as MPEG-2 transport streams. It will be appreciated that the methods described according to the present invention may be implemented for the computation of loss and loss curves for a variety of additional traffic sources, such as may be subject to transmission over a packet network.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

| Trace | Frame Rate (Hertz) | Number of Frames | Video Length (minutes) | Running Time (seconds) | Space (# points) |
|---|---|---|---|---|---|
| mr. bean | 25 | 40000 | 26.7 | 2.3 | 18812 |
| asterix | 25 | 40000 | 26.7 | 2.8 | 24345 |
| atp | 25 | 40000 | 26.7 | 2.5 | 22641 |
| bond | 25 | 40000 | 26.7 | 2.9 | 27169 |
| dino | 25 | 40000 | 26.7 | 1.9 | 14293 |
| lambs | 25 | 40000 | 26.7 | 1.6 | 9632 |
| movie2 | 25 | 40000 | 26.7 | 2.1 | 17634 |
| mtv1 | 25 | 40000 | 26.7 | 3.3 | 28262 |
| mtv2 | 25 | 40000 | 26.7 | 5.2 | 22525 |
| news1 | 25 | 31515 | 21.0 | 2.1 | 20036 |
| news2 | 25 | 40000 | 26.7 | 2.1 | 16888 |
| race | 25 | 40000 | 26.7 | 4.2 | 33317 |
| sbowl | 25 | 40000 | 26.7 | 2.5 | 24044 |
| simpsons | 25 | 40000 | 26.7 | 2.3 | 20527 |
| soccer1 | 25 | 40000 | 26.7 | 3.2 | 30265 |
| soccer2 | 25 | 40000 | 26.7 | 3.1 | 27129 |
| star | 25 | 40000 | 26.7 | 1.8 | 12189 |
| talk1 | 25 | 40000 | 26.7 | 1.9 | 14110 |
| talk2 | 25 | 40000 | 26.7 | 2.0 | 15683 |
| terminator | 25 | 40000 | 26.7 | 1.7 | 11396 |
| Garrett's trace | 24 | 174136 | 120.9 | 11.2 | 89489 |

What is claimed is:

1. A method for determining the loss rate of a traffic source, comprising:
    transmitting the frames of an actual or simulated traffic source into a peak-rate shaper having an input queue mechanism and producing a new time sequence for the bit-stream of the input traffic source as output traffic at rate r;
    collecting the bit-stream at the output of the peak-rate shaper a(r,t) into a leaky-bucket shaper, said traffic source at said output having a transmission rate ρ and a buffer of size B;
    recording busy periods of the traffic source at rate ρ received in buffer of size B;
    recording buffer points at which loss occurs for each busy period recorded; and
    determining the maximum loss for buffer size B at rate ρ.

2. A method as recited in claim 1, further comprising plotting a loss rate curve for a desired range of buffer sizes B of interest by executing additional iterations to determine maximum loss rate across the range of buffer sizes.

3. A method as recited in claim 1, wherein the traffic source comprises a data stream selected from the group of data streams consisting of multimedia data streams, elementary video streams, and MPEG-2 transport streams.

4. A method of determining loss rate for a traffic source at a given rate ρ received in a buffer of size B, comprising:
    transmitting the frames of an actual or simulated traffic source into a peak-rate shaper having an input queue mechanism, and producing a new time sequence for the bit-stream of the input traffic source within an output traffic of rate r;
    collecting the bit-stream at the output of the peak-rate shaper a(r,t) into a leaky-bucket shaper, said traffic source at said output having a transmission rate ρ and a buffer of size B;
    determining the set of active periods and associated queue lengths for the frames of the traffic source at rate ρ;
    determining busy periods for rate ρ and buffer size B; and
    iteratively examining the busy periods to determine points of loss and busy period breaks for the given buffer size B; and
    outputting maximum detected loss rate.

5. A method as recited in claim 4, wherein the traffic source comprises a data stream selected from the group of data streams consisting of multimedia data streams, elementary video streams, and MPEG-2 transport streams.

6. A method as recited in claim 4, wherein piecewise linearity is exploited between arising points of loss and busy period breaks to define a loss curve indicating loss rate versus buffer size B for a given value of transmission rate $\rho$.

7. A method as recited in claim 6, further comprising computing loss curves across a range of given transmission rates $\rho$, to provide three-dimensional information about losses with respect to buffer size B and transmission rate $\rho$.

* * * * *